United States Patent [19]
Kim

[11] 3,897,271

[45] July 29, 1975

[54] SELF-CONTAINED STATIC POWER SYSTEM

[75] Inventor: Chang-Kyo Kim, Severna Park, Md.

[73] Assignee: Westinghouse Electric Corporation, Pittsburgh, Pa.

[22] Filed: Apr. 25, 1973

[21] Appl. No.: 354,616

Related U.S. Application Data

[63] Continuation of Ser. No. 117,370, Feb. 22, 1971, abandoned.

[52] U.S. Cl. .................................... 136/202; 176/39

[51] Int. Cl.² ..................... G21H 1/10; H01L 35/00

[58] Field of Search ................. 136/202; 176/39, 87

[56] References Cited

UNITED STATES PATENTS

| | | | |
|---|---|---|---|
| 3,192,069 | 6/1965 | Vogt et al. | 136/202 |
| 3,347,711 | 10/1967 | Banks, Jr. et al. | 136/202 |
| 3,378,449 | 4/1968 | Roberts et al. | 136/202 |
| 3,391,322 | 7/1968 | Findley, Jr. et al. | 136/202 |
| 3,437,847 | 4/1969 | Raspet | 136/202 |
| 3,496,026 | 2/1970 | Mayo | 136/202 |
| 3,517,730 | 6/1970 | Wyatt | 136/202 |
| 3,666,566 | 3/1972 | Paine | 136/202 |
| 3,672,443 | 6/1972 | Bienert et al. | 136/202 |
| 3,728,160 | 4/1973 | DesChamps et al. | 136/202 |

FOREIGN PATENTS OR APPLICATIONS

| | | | |
|---|---|---|---|
| 194,901 | 3/1968 | U.S.S.R. | 136/202 |

OTHER PUBLICATIONS

NYO-9783 "Power Flattening studies for Radioisotope-Thermoelectric Generators," Feb. 1963, pp. 65-68.

TID-22350, 1965, pp. 10-12, 19, 62-69, 71, 128.

*Primary Examiner*—Harvey E. Behrend
*Attorney, Agent, or Firm*—D. C. Abeles

[57] ABSTRACT

A self-contained static power system is disclosed herein having a tubular thermoelectric generator generally disposed within a housing. An isotopic self-sustaining heat source is thermally coupled to the heat reservoir of the tubular thermoelectric generator to provide the requisite thermal energy necessary for the production of electric power therefrom. A liquid sodium heat pipe cooperates in one embodiment to more efficiently transport the heat from the heat source to the tubular thermoelectric generator to achieve a compact and entirely static power system.

9 Claims, 3 Drawing Figures

SELF-CONTAINED STATIC POWER SYSTEM

This is a continuation of application Ser. No. 117,370 filed Feb. 22, 1971, now abandoned.

BACKGROUND OF THE INVENTION

This invention pertains in general to self-contained static electric power generating systems and more particularly to such systems that employ tubular thermoelectric generators.

A remote and unattended power system deployed at a generally inaccessible site, such as the deep ocean floor, mountain top, arctic, or antarctic regions, requires extremely reliable and maintenance free equipment. Recent developments in the art of thermoelectrics and their application to tubular thermoelectric devices have achieved a reliable and extremely rugged power converter. However, the present state of the art has employed dynamic heat transfer loops, such as liquid metal flow from a heat source to a thermoelectric unit, to achieve the thermal gradient required to operate such units. Such heat transfer methods require dynamic devices, such as pumps, to transfer the liquid metal from the heat source to the thermoelectric unit. Elimination of such dynamic devices from a power system, to achieve a totally static system, enhances the systems reliability so as to enable it to operate in remote regions completely unattended.

Therefore, it is the object of this invention to provide a completely self-contained static electric power generating system that requires little or no maintenance for long range power needs.

It is a further object of this invention to provide a self-contained static power generating system that is relatively economical and competitive with systems that employ electrochemical conversion and systems employing conversion of thermal power obtained from combustion.

SUMMARY OF THE INVENTION

This invention achieves the aforementioned objects by providing a completely self-contained static thermoelectric power system for the generation of electricity. The system thus disclosed basically comprises a tubular thermoelectric generator generally disposed within a hermetically sealed housing. A self-sustaining heat source is provided within the housing and is thermally coupled to the generator to provide an entirely static compact power system. The self-sustaining heat source may be of the isotopic variety and an encapsulated cobalt 60 fuel is illutrated herein as exemplary for this purpose. The isotopic heat source may be deployed within the center of the tubular thermoelectric generator or a high flux heat transport device such as a liquid sodium heat pipe may be used to transfer heat from the heat source to the thermoelectric generator. The heat pipe transport means is preferred in order to more efficiently match the heat flux from the heat source and the performance characteristics of the thermoelectric generator. The resultant hermetically sealed unit comprising heat source, heat pipes, and tubular compact converter cooperate to provide a very compact, efficient and totally static power unit which is readily applicable for both terrestrial and undersea environments.

BRIEF DESCRIPTION OF THE DRAWINGS

For a better understanding of the invention, reference may be had to the preferred embodiments, exemplary of the invention, shown in the accompanying drawings, in which.

DESCRIPTION OF THE PREFERRED EMBODIMENT

Figure 1:
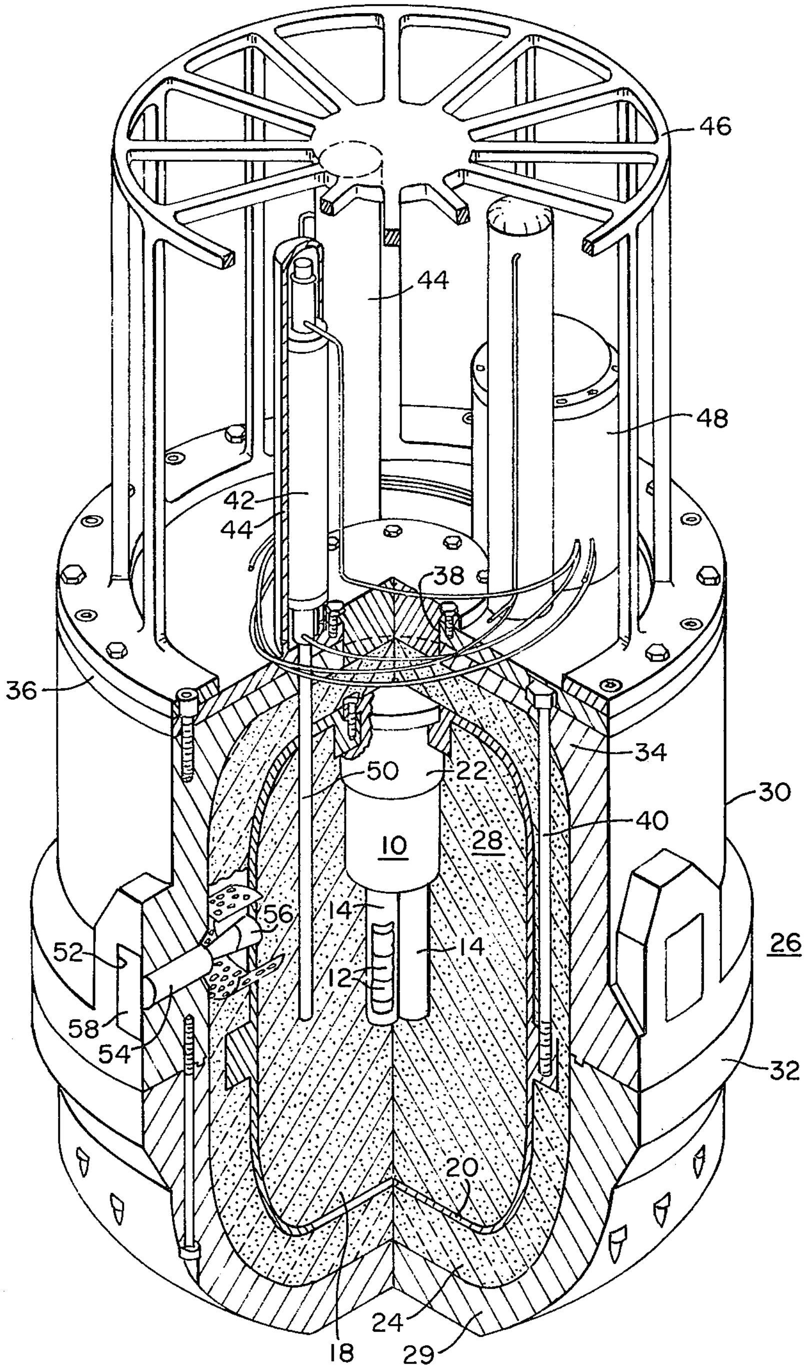
FIG. 1 is a perspective view of an embodiment of this invention with a quarter section thereof cut away for clarity.

A remote and unattended power system deployed at a relatively inaccessible site, such as the deep ocean floor, mountain top, arctic or antarctic regions requires extremely reliable and maintenance free equipment. Recent developments in the art of thermoelectrics have produced tubular thermoelectric generators which are extremely reliable and rugged power converters. Today, such generators are well known in the art and an example thereof may be found in U.S. Pat. No. 3,481,794 by Kenneth Kasschau entitled Thermoelectric Device With Plastic Strain Inducing Means, patented Dec. 2, 1969, and assigned to the Westinghouse Electric Corporation. In the past, such converters were employed with dynamic heat transport devices, such as liquid metal heat transfer loops with their associative pump transport mechanisms, to thermally couple the heat source with the thermoelectric unit. Such dynamic components reduce the reliability of the system and their desirability for remote applications. In order to increase the reliability of such systems for remote applications this invention employs cooperative static coupling of the heat source with the tubular thermoelectric unit. The heat source thus disclosed in a self-sustaining unit and may be of the isotopic variety, such as a shielded cobalt 60 fuel capsule. It is to be understood that this is merely one example of a heat source which may be used with this invention and other self-sustaining heat sources are well known and are readily available, such as those which depend on exothermic chemical reactions for their heat generation.

In accordance with this invention a heat source, such as a cobalt 60 fuel capsule, is closely received within the interior of a tubular thermoelectric unit to provide a compact and entirely static power unit. However, in the embodiment just disclosed, only about 70 percent of the total available gamma energy can be utilized in order to match the heat flux from the heat source and the performance characteristics of the tubular converter. Reflecting on the cost of such fuel, it is desirable to utilize all of the gamma energy to achieve a relatively economical power system. Thus, to achieve this result the preferred embodiment of this invention, as set forth hereinafter, combines the desirable features of the reliable and rugged tubular thermoelectric converter, the high flux heat transport characteristics of heat pipes and the relatively economical, readily available isotope cobalt 60 to achieve a compact and entirely static power system.

A large quantity of cobalt 60 isotopes are readily available as a by-product of nuclear reactor operations. The cobalt 60, thus produced, has a high specific activity of up to 500 curies/gm, with the 5.24 year half life and thus represents a relatively economical and long service life fuel form. Since cobalt 60 is a gamma source, shielding must be provided to generate thermal energy for power and to reduce the radiation dose of the power system. A shield block formed by 6 to 7 inches of tungsten and having an opening therein to receive the isotopic power source to thus surround the fuel capsule achieves these objectives. The shield block also is provided with openings therein to receive the heat pipes therein and the shield material serves as a heat transfer medium between the heat source and heat pipes. In order to provide a reliable means of heat transfer from the heat source (capsule plus shield) to the tubular thermoelectric converter, a high flux heat transport device, such as a heat pipe employing a liquid metal such as liquid sodium as the vaporizable medium, is used. Liquid sodium heat pipes, matching the heat input characteristics of tubular compact converter sizes, have already been developed and are a state-of-the-art hardware. The operation and fabrication of such heat pipes may be found more fully described in the following U.S. patent applications: application Ser. No. 17,106 entitled Heat Pipe Wick Restrainer, by Frank G. Arcella, filed Mar. 6, 1970; and application Ser. No. 17,117 entitled Heat Pipe Wick Fabrication, by Frank G. Arcella et al., filed Mar. 6, 1970. A hermetically sealed power system composed of heat source, heat pipes, and tubular compact converters as herein described results in a very compact, efficient, and totally static power supply unit which is readily applicable for both terrestrial and undersea environments.

Figure 2:
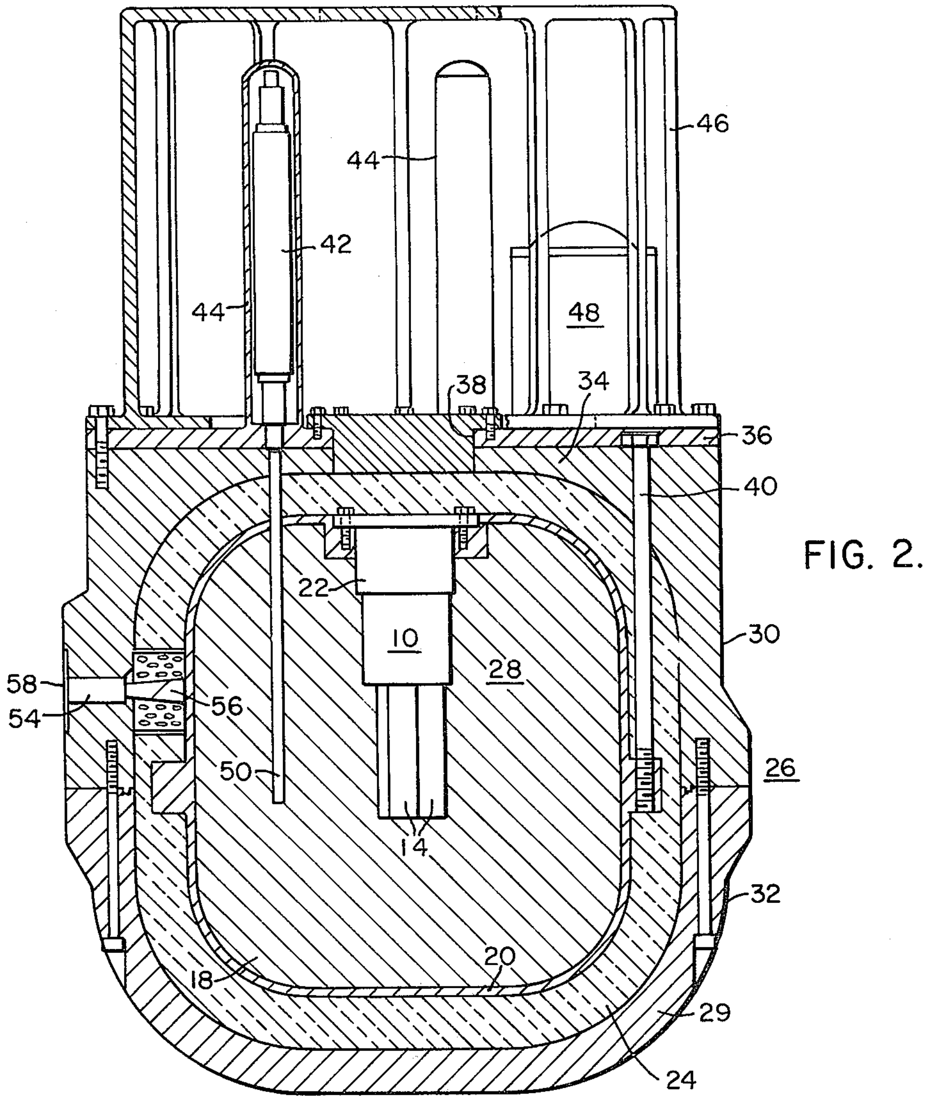
FIG. 2 is a longitudinal sectional view of the embodiment illustrated in FIG. 1.

Referring to FIGS. 1 and 2, it will be seen that the unit illustrated therein is specifically designed for underseas application, however, it is to be understood that this is only an exemplary embodiment of this invention and that its application to other environmental surroundings requires only slight modification. More particularly, it will be appreciated that a heat source 28 is provided which comprises an insulated tungsten shield block 18 which completely surrounds the radiation source 10. The shield block 18 is desirably clad with a suitable cladding 20 of, for example, stainless steel. The radiation source 10 is constructed from a plurality of cobalt 60 fuel capsules 14, three such capsules being illustrated in this example. Each of the capsules, thus shown, may be constructed from a plurality of cobalt 60 wafers 12 stacked in tandem and may be doubly encapsulated in a super alloy cladding; for example the inner encapsulation may be constructed out of a cobalt base alloy having varying amounts of tungsten and chromium, such as the alloy sold under the trade name Haynes-25 alloy by the Haynes Stellite Company Kokomo, Indiana; and the outer cladding may be constructed out of a nickel base alloy having varying amounts of molybdenum, chromium, manganese, copper, silicon and iron such as the alloy sold under the trade name Hastelloy-X alloy by the Haynes Stellite Company. The three fuel capsules 14 are arranged in a triangular array within the tungsten shield 18 which forms a shaped circular cylinder around the radiation source 10. The tungsten shielding block 18 is encased in a thick stainless steel cladding 20 which provides increased radiation shielding. A removable stepped plug 22 is provided, which receives the cobalt 60 capsules 14 in the center thereof to allow insertion of the fuel capsules 14 into a cavity 38 within the shield 18. A thick fusible insulation 24 (to be described hereinafter) surrounds the shield assembly 20 and provides thermal insulation so as to maintain a thermal gradient between the outside of the pressure vessel 26 and the fuel capsule 14. The heat source pressure vessel 26, made in this example, of top and bottom halves, 30 and 32 respectively, is sized for a hydrastatic pressure corresponding to 4,000 ft. ocean depth and is provided with a cover plate 34 at the top to mate with the thermoelectric converter mounting plate 36. A central opening 38 is provided in each of these plates to allow for the insertion and removal of the tungsten shield plug 22. Eight bolts, 40, secure the shield assembly to the pressure vessel structure 26.

A plurality of thermoelectric converters 42 are provided, as hereinbefore described, three such converters being shown in this illustration. The converters 42 are each housed in a tubular pressure vessel 44 which is structurally assembled on the base plate 36. The converters 42 are protected from an external bumping load by a cage structure 46. An electrical power conditioning package 48, as will be hereinafter described, is placed within this protective cage 46 and mounted on top of the heat source pressure vessel 26. A corresponding number of heat pipes 50, equal to the number of thermoelectric units 42, are symmetrically positioned circumferentially around the radiation source 10; each heat pipe 50 being thermally coupled at one end within the interior of its respective thermoelectric converter 42 and extending longitudinally therefrom, through the pressure vessel housing 26, into openings formed in the tungsten heat shield 18 to a depth coextensive with the fuel capsules 14. It is to be understood that while liquid sodium has been described as the working fluid for the heat pipes, other working fluids, such as mercury, are available and may be used for this purpose, depending upon the power demands and environmental operating conditions encountered.

Figure 3:
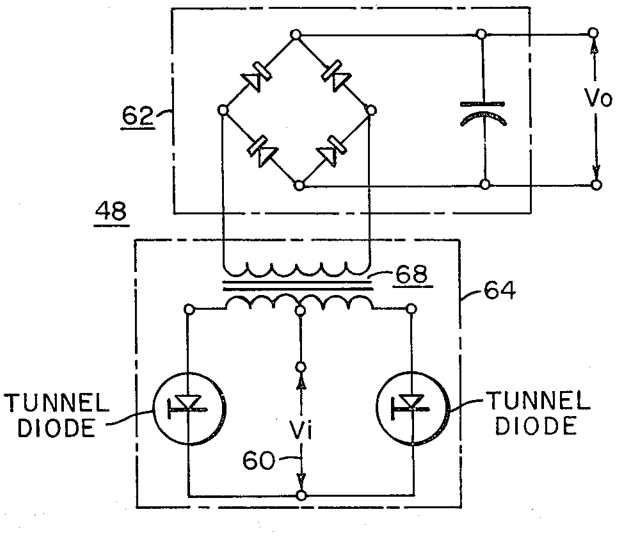
FIG. 3 illustrates an exemplary power conditioning circuit.

The power conditioning package 48 provides the final stage of electrical refinement for the current produced by the thermoelectric generators 42 and is designed to reduce the current, thus formed, to the load requirements. In this embodiment, the power conditioning package comprises an inverter 64, a transformer 68, and a rectifier 62 as illustrated in FIG. 3. The three generators, herein described, are connected in series and the output therefrom is connected to the input terminals 60 of the inverter 64, located within the electrical conditioning package 48. The inverter 64 may be a germanium or silicon device which is well known in the art and is readily available. The output of the inverter can be any convenient frequency; conceivably chosen to satisfy some specific application for alternating current. The next step in power conditioning is to increase the voltage and this is accomplished by means of a transformer 68. Such transformers are also well known in the art and are readily available. The final step in power conditioning is rectification. This may be achieved with either silicon or germanium solid state devices which are well known. A schematic diagram of an exemplary circuit embodying these components is illustrated in FIG. 3, however, specific examples of these devices are not given because their characteristics will depend upon the amount of heat produced by the radiation source; the thermal efficiency of the heat pipes used to communicate the heat from the source to thermal electric generators; the efficiency of the thermal electric generators in converting the thermal energy into electrical energy; and the requirements of the specific application to which this electrical power unit is to be applied. The design calculations used to specify these specific components are familiar tools to those skilled in the electrical art. Examples of the operation of such a system may be found in application Ser. No. 152,586, filed Nov. 15, 1961, entitled "Low Voltage Inverter", by Paul F. Pittnam.

The exemplary embodiment illustrated in FIGS. 1 and 2 includes several safety features which provide emergency cooling in case of failure of one or more of the heat pipes. Emergency cooling is accomplished by means of the fusible insulation hereinbefore described by reference character 24. This insulation is a silicon based material which behaves like a thermal switch. The insulation material remains intact up to about 1300°F, which allows for a substantial temperature margin over the normal power unit operating temperatures. However, above this temperature, the insulation layer fuses together to form a glass layer over the shield clad 20 and thus loses its insulating property entirely. When the insulation layer is fused together, its volume is reduced, leaving a gap between the shield clad 20 and the stainless steel pressure vessel shell 29. The total thermal power can then be readily dissipated to the surrounding water by radiation heat transfer across this gap and conduction through the pressure vessel shell 29 without causing the fuel capsule 14 to melt.

An alternate emergency cooling system is also illustrated which utilizes the good heat transfer characteristics of water to provide cooling in case of failure of one or more of the heat pipes. In the event the shield temperature rises above a predetermined level, sea water is admitted to the pressure vessel, decreasing the thermal resistance of the insulation 24 by a factor of ten or more. Sea water is admitted through a port 52, closed by a loosely fitted piston 54, which is supported against the sea pressure by a strut 56, designed to fail at a predetermined temperature. For deep submergence, a seal is provided by a thin diaphragm 58 which will rupture when the supporting strut 56 fails. For shallow applications, the diaphragm 58 is replaced by an O-ring seal. The strut 56 is a conical piece of steel with a brazed diagonal joint near the enlarged end. Brazing materials can be selected which show high strength at temperatures in the neighborhood of 1300°F, but which melt in the neighborhood of 2200°F. Although the actual failure temperature may vary between these two limits, decreasing with increasing depth, the use of such a brazing material would ensure failure safely below the point at which the fuel capsules 14 would melt. The use of a tapered support strut enables the strut to be designed for deep submergence with minimal thermal losses. The enlarged diameter end of the strut 56 is located near the high temperature portion thereof, so that the reduction in material strength with increasing temperature can be compensated for.

Thus a totally static power generator has been described which is compact and relatively economical and applicable for long range maintenance free applications.

I claim as my invention:

1. A self-contained static electric power generating system comprising:

a self-sustaining heat source;

a housing completely surrounding and encapsulating said heat source;

means positioned external of said housing and responsive to the heat radiated by said heat source to generate an electrical output;

means thermally and statically coupling said heat source to a heat reservoir associated with said heat responsive means;

a hermetically sealed port formed integral with and through a wall of said housing and responsive to the heat radiated within said housing to unseal above a predetermined temperature level above the designed operating temperature of said heat source occurring as a result of a failure in operation of said thermal coupling means to transport a given designed quantity of heat from said heat source to said heat reservoir associated with said heat responsive means, to expose the interior of said housing to the exterior thereof; and thermal insulation positioned between said housing and said heat source to reduce the amount of heat radiated through said housing to the exterior thereof, said thermal insulation fusing above the predetermined temperature level in a manner that enhances the radiation of heat from said heat source through said housing to the exterior thereof.

2. The static power system of claim 1 wherein said sealed port comprises a tubular conduit formed integral with and through a wall of the housing closed by a loosely fitted piston supported in position by a strut supported internally of the housing, one portion of the piston positioned adjacent the exterior wall of the housing is affixed with a seal that hermetically closes the port, the strut being designed to fail at the predetermined temperature in a manner that releases support to the piston and enables the piston under pressure exerted exterior of the housing to unseal the port.

3. The static power system of claim 2 wherein the strut is wedged between the piston and a structural member of the housing and includes a braze joint designed to melt at the predetermined temperature in a manner that enables at least a portion of the strut to slide out of position to a location where it fails to render further support to the piston.

4. The static power system of claim 1 including at least one heat pipe having a heat reservoir and a heat sink, said heat reservoir of said heat pipe being thermally coupled to said heat source and said heat sink of said heat pipe being thermally coupled to said reservoir of said heat responsive means so as to transport heat from said heat source to said heat responsive means.

5. The static power system of claim 1 wherein said heat source comprises a radioisotopic heat source.

6. The static power system of claim 5 wherein said radioisotopic heat source comprises a cobalt 60 fuel capsule.

7. The static power system of claim 4, wherein said heat pipe comprises a liquid sodium heat pipe.

8. The static power system of claim 1 wherein said heat responsive means comprises at least one thermoelectric generator.

9. The static power system of claim 1 wherein the electrical output from said heat responsive means is electrically connected to power conditioning equipment comprising:

an inverter electrically coupled to said heat responsive means output;

a transformer electrically coupled to said inverter; and a rectifier electrically coupled to said transformer so as to produce a rectified current output.

* * * * *